US010343672B2

(12) United States Patent
Graf

(10) Patent No.: US 10,343,672 B2
(45) Date of Patent: Jul. 9, 2019

(54) OPERATION SCHEMES FOR A HYBRID OR ELECTRIC VEHICLE

(71) Applicant: Continental Automotive GmbH, Hannover (DE)

(72) Inventor: Friedrich Graf, Sinzing (DE)

(73) Assignee: CONTINENTAL AUTOMOTIVE GMBH, Hanover (DE)

(*) Notice: Subject to any disclaimer, the term of this patent is extended or adjusted under 35 U.S.C. 154(b) by 55 days.

(21) Appl. No.: 15/524,350

(22) PCT Filed: Nov. 2, 2015

(86) PCT No.: PCT/EP2015/075370
§ 371 (c)(1),
(2) Date: May 4, 2017

(87) PCT Pub. No.: WO2016/071251
PCT Pub. Date: May 12, 2016

(65) Prior Publication Data
US 2018/0290646 A1    Oct. 11, 2018

(30) Foreign Application Priority Data
Nov. 4, 2014    (DE) .................. 10 2014 222 513

(51) Int. Cl.
*B60W 20/13*    (2016.01)
*B60W 50/00*    (2006.01)
(Continued)

(52) U.S. Cl.
CPC ............. *B60W 20/13* (2016.01); *B60L 58/12* (2019.02); *B60W 10/06* (2013.01); *B60W 10/08* (2013.01);
(Continued)

(58) Field of Classification Search
None
See application file for complete search history.

(56) References Cited

U.S. PATENT DOCUMENTS 8,589,009 B2    11/2013    Hirsch et al. ............... 701/22
8,725,339 B2     5/2014    Justin et al. ............... 701/22
(Continued)

FOREIGN PATENT DOCUMENTS

CN    102019926 A    4/2011    ............ B60W 10/06
CN    102712261 A    10/2012   ............ B60K 6/48
(Continued)

OTHER PUBLICATIONS

German Office Action, Application No. 102014222513.2, 6 pages, dated Aug. 17, 2015.
(Continued)

*Primary Examiner* — Richard M Camby
(74) *Attorney, Agent, or Firm* — Slayden Grubert Beard PLLC

(57) ABSTRACT

The present disclosure is related to hybrid vehicles. The teachings thereof may be embodied in vehicles as well as operation schemes meant to increase energy efficiency, such as a method comprising: detecting multiple consumption parameters of the hybrid vehicle; determining a future state of charge of a traction battery of the vehicle by mapping the consumption parameters onto a state-of-charge value, wherein the mapping includes classifying the multiple consumption parameters according to trainable class boundaries; training the class boundaries based at least in part on the detected consumption parameters and an associated measured state of charge; and adjusting an operating parameter of a traction power component of the hybrid vehicle according to the determined future state of charge.

20 Claims, 2 Drawing Sheets

(51) Int. Cl.
*B60W 10/06* (2006.01)
*B60W 10/08* (2006.01)
*B60W 10/26* (2006.01)
*B60W 20/10* (2016.01)
*B60W 20/12* (2016.01)
*B60W 10/119* (2012.01)
*B60W 10/30* (2006.01)
*B60W 30/18* (2012.01)
*B60W 30/188* (2012.01)
*B60W 40/12* (2012.01)
*B60L 58/12* (2019.01)
*B60K 6/22* (2007.10)
*B60K 6/52* (2007.10)

(52) U.S. Cl.
CPC .......... *B60W 10/119* (2013.01); *B60W 10/26* (2013.01); *B60W 10/30* (2013.01); *B60W 20/10* (2013.01); *B60W 20/12* (2016.01); *B60W 30/18072* (2013.01); *B60W 30/1886* (2013.01); *B60W 40/12* (2013.01); *B60W 50/0097* (2013.01); *B60K 6/22* (2013.01); *B60K 6/52* (2013.01); *B60L 2240/12* (2013.01); *B60L 2240/16* (2013.01); *B60L 2240/34* (2013.01); *B60L 2240/36* (2013.01); *B60L 2240/42* (2013.01); *B60L 2240/44* (2013.01); *B60L 2240/70* (2013.01); *B60L 2260/46* (2013.01); *B60L 2260/54* (2013.01); *B60W 2050/0014* (2013.01); *B60W 2510/1005* (2013.01); *B60W 2510/244* (2013.01); *B60W 2510/305* (2013.01); *B60W 2520/10* (2013.01); *B60W 2520/105* (2013.01); *B60W 2550/12* (2013.01); *B60W 2550/14* (2013.01); *B60W 2550/20* (2013.01); *B60W 2550/402* (2013.01); *B60W 2710/06* (2013.01); *B60W 2710/08* (2013.01); *B60W 2710/244* (2013.01); *B60W 2710/30* (2013.01); *B60W 2720/40* (2013.01); *B60W 2750/00* (2013.01); *B60Y 2200/91* (2013.01); *B60Y 2200/92* (2013.01); *B60Y 2300/18066* (2013.01); *Y02T 10/6291* (2013.01); *Y02T 10/7005* (2013.01); *Y02T 10/705* (2013.01); *Y02T 10/7044* (2013.01); *Y02T 10/7291* (2013.01); *Y02T 90/16* (2013.01); *Y10S 903/904* (2013.01); *Y10S 903/916* (2013.01); *Y10S 903/93* (2013.01)

(56) References Cited

U.S. PATENT DOCUMENTS

| 8,825,243 | B2 | 9/2014 | Yang et al. ..................... 701/22 |
| 8,996,218 | B2 | 3/2015 | Gehring et al. ................ 701/22 |
| 2008/0249667 | A1 | 10/2008 | Horvitz et al. .................... 701/1 |
| 2015/0239455 | A1* | 8/2015 | Qiu ........................ B60W 20/11 701/22 |

FOREIGN PATENT DOCUMENTS

| CN | 103269933 A | 8/2013 | ............ B60W 10/26 |
| DE | 102009030784 A1 | 2/2010 | ............ B60W 10/04 |
| DE | 102011018769 A1 | 10/2012 | ............. B60L 11/12 |
| DE | 102012023632 A1 | 6/2014 | ............ B60R 16/02 |
| EP | 2752962 A1 | 7/2014 | ............. B60L 11/18 |
| WO | 2008/128416 A1 | 10/2008 | ............ B60W 10/04 |
| WO | 2016/071251 A1 | 5/2016 | ............. B60L 11/18 |

OTHER PUBLICATIONS

International Search Report and Written Opinion, Application No. PCT/EP2015/075370, 18 pages, dated Feb. 29, 2016.
Chinese Office Action, Application No. 201580060130.7, 12 pages, dated Oct. 9, 2018.

* cited by examiner

OPERATION SCHEMES FOR A HYBRID OR ELECTRIC VEHICLE

CROSS-REFERENCE TO RELATED APPLICATIONS

This application is a U.S. National Stage Application of International Application No. PCT/EP2015/075370 filed Nov. 2, 2015, which designates the United States of America, and claims priority to DE Application No. 10 2014 222 513.2 filed Nov. 4, 2014, the contents of which are hereby incorporated by reference in their entirety.

TECHNICAL FIELD

The present disclosure is related to hybrid vehicles. The teachings thereof may be embodied in vehicles as well as operation schemes meant to increase energy efficiency.

BACKGROUND

In the case of hybrid vehicles and, in particular, electric vehicles, both the range and the energy efficiency are dependent on efficient utilization of the loads. If the driver makes good use of sailing or recuperation phases, for instance, greater savings result. This savings potential, however, cannot be realized by driver control because the information is not readily gathered by the driver.

SUMMARY

The teachings of the present disclosure may demonstrate methods for further increasing the energy efficiency.

For example, some embodiments may include methods for operating a hybrid or electric vehicle, including the steps of: detecting multiple consumption parameters of the hybrid vehicle; determining a future state of charge of a traction battery of the vehicle by mapping the consumption parameters onto a state-of-charge value, wherein the mapping is implemented by classifying the multiple consumption parameters according to trainable class boundaries; training the class boundaries on the basis of the detected consumption parameters and an associated measured state of charge and adjusting at least one operating parameter of a traction power component of the hybrid vehicle according to the determined future state of charge.

In some embodiments, one or more of the following parameters are detected as the consumption parameters: vehicle speed of the vehicle; acceleration of the vehicle; the engaged gear of a traction transmission in the case of a hybrid vehicle; the battery terminal voltage of the traction battery or its rate of change; the output of an electric traction machine of the hybrid vehicle; the output of the air conditioning system; the output of the windshield heating system; the output of the lighting system; the output of the catalytic converter heating system in the case of a hybrid vehicle; the output for traveling on an uphill grade; the output of an engageable electric all-wheel auxiliary drive in the case of a hybrid vehicle; recuperation performance; the charging rate during charging by the internal combustion engine; and the driving style.

In some embodiments, the consumption parameters are detected on the basis of a current measurement or are estimated for a future period of time on the basis of an upcoming route of a navigation device of the hybrid vehicle.

In some embodiments, the consumption parameters are estimated on the basis of traffic, road, or weather conditions of the upcoming route.

In some embodiments, in the classification step, consumption parameter values that are relevant for each consumption parameter are subdivided into at least two classes by means of the class boundaries, which define a hypersurface, which separates differently classified consumption parameter values, wherein different states of charge are assigned to different combinations of classes, and consumption parameter values to be detected are determined via the mapping of the associated state of charge.

In some embodiments, the determination of the state of charge and the training relate to a support vector machine, by means of which the consumption parameter is mapped, wherein the consumption parameter values relate to a vector of the support vector machine and the class boundaries are depicted by a hyperplane, and wherein, furthermore, the training of the class boundaries is carried out by adapting the class boundaries to detected consumption parameters that correspond to the training vectors or training objects of the support vector machine.

In some embodiments, the mapping step is carried out in a calculation device within the hybrid vehicle, or the mapping step is carried out in a stationary calculation device, in particular in a central or distributed calculation device, the detected consumption parameters are transmitted from the hybrid vehicle to the calculation device, and the determined state of charge is transmitted from the calculation device to the hybrid vehicle.

In some embodiments, the mapping step is carried out in the stationary calculation device and, in the calculation device, the mapping step is carried out by means of a joint mapping for multiple vehicles.

In some embodiments, at least one of the following parameters is adjusted as the operating parameter in accordance with an optimization objective: the activation state of an electric traction machine and an internal combustion engine of the vehicle; the charging rate of the traction battery; the output of the air conditioning system; the output of the windshield heating system; the output of the lighting system; the output of the catalytic converter heating system; and the maximum duration of a sailing or coasting phase.

In some embodiments, the optimization objective is a minimized total consumption, a maximum service life, a maximum range, or a maximum charging current of the traction battery, or a weighted combination of these optimization objectives.

BRIEF DESCRIPTION OF THE DRAWINGS

The attached figures further elucidate the teachings of the present disclosure, wherein.

DETAILED DESCRIPTION

Figure 1:
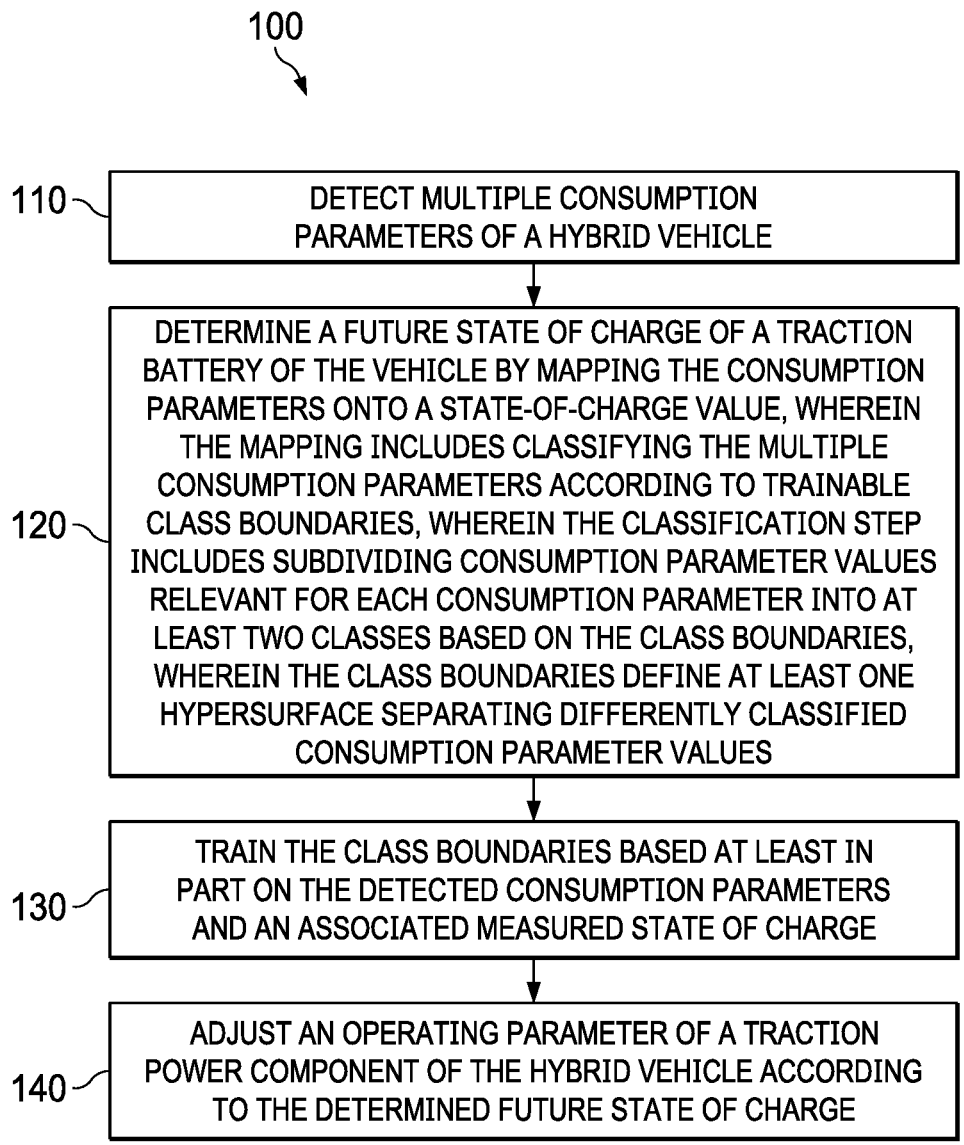
FIG. 1 is a flowchart illustrating a method incorporating teachings of the present disclosure.

The teachings of the present disclosure include a prediction of a state of charge, in which numerous different consumption parameters or consumption and charging parameters (charging processes can also be included) are processed, e.g., parameters that influence the energy consumption of the vehicle. In the case of multiple consumption parameters, said consumption parameters cannot be readily grasped and correctly weighted in their totality by the driver. Instead, the systems of the present disclosure may detect multiple consumption parameters and utilize these for determining a future state of charge (e.g., for predicting the state of charge), to optimize the operation and the functions of the vehicle based on this state of charge.

The prediction may be based on a classification of the consumption parameters, wherein, in the case of multiple consumption parameters, there is a resultant vector having individual scalar quantities which correspond to the individual consumption parameters. The vector (the consumption parameters) is classified as a whole, wherein an individual classification results for each consumption parameter, but the consumption parameters are considered as a whole (as a vector) in the determination of the state of charge. The classification is a binary classification, in particular, and therefore a hypersurface (a surface having a dimension which relates to the number of different consumption parameters) can be utilized for the classification. A binary classification can be implemented using one single boundary per consumption parameter, wherein the boundary not only defines the membership to one of the two resultant hyper half-spaces, but is also suitable for determining the distance of the consumption parameters to the particular boundaries. The classification is trainable to differentiate between consumption parameters that belong to different situations.

Not only can consumption parameters of one vehicle be considered, but the same consumption parameters of multiple vehicles can also be utilized for the determination. A mapping, which is based on the aforementioned classification, can be utilized jointly for multiple consumption parameters of different vehicles, in order to thereby provide for a more robust prediction.

Since the consumption parameters can also relate to charging parameters, the term "consumption and charging parameter" can also be used instead of the term "consumption parameter".

Some embodiments comprise a method for operating a hybrid or electric vehicle, wherein multiple consumption parameters of the vehicle are initially detected. Furthermore, a future state of charge of a traction battery of the vehicle is determined. This determination is also referred to as a prediction or an estimate. In the determination, the consumption parameter is mapped onto a state-of-charge value. The mapping is implemented by classifying the multiple consumption parameters according to trainable class boundaries. The boundaries separate a first group of consumption parameter values from a second group of consumption parameter values, wherein both groups are provided on both sides of the class boundaries or the hypersurface.

The class boundaries are trained on the basis of the detected consumption parameters and an associated measured (or established in any other way) state of charge. "Training" is understood to be a learning process in which learning data in the form of detected consumption parameters (=actual consumption parameters) and the measured state of charge (=actual state of charge) are specified, wherein the class boundaries are adjusted or modified on the basis of these learning data.

At least one operating parameter of a traction power component of the hybrid vehicle is adjusted according to the determined future state of charge. In other words, the open-loop or closed-loop control of an operating parameter of a traction power component is dependent on the determined, future state of charge.

Vehicle parameters that are directly related to the traction or the vehicle motion can be detected as consumption parameters, or secondary loads such as heating or lighting can be considered as consumption parameters. In addition, indirect values that are functionally linked to the relevant parameter, but that relate to another component or physical variable, for example the battery terminal voltage, can be utilized, on the basis of which an energy management of the battery itself can be detected. The consumption parameters include:

the vehicle speed of the vehicle,
the acceleration of the vehicle (in particular the amplitude, mean or median of accelerations, and/or frequency of acceleration processes),
the engaged gear of a traction transmission in the case of a hybrid vehicle,
the battery terminal voltage of the traction battery or its rate of change, the output of an electric traction machine of the hybrid vehicle,
the output of the air conditioning system (electric heating or cooling),
the output of the windshield heating system,
the output of the lighting system,
the output of the catalytic converter heating system in the case of a hybrid vehicle, wherein this relates to an electric heating of a catalytic converter unit of an exhaust gas aftertreatment,
an output for traveling on an uphill grade (wherein this lies on the upcoming route),
a recuperation performance (wherein this can relate to downhill grades on the upcoming route),
an output in a temporary short-distance electric mode ("boost mode"),
an output of an engageable electric all-wheel auxiliary drive in the case of a hybrid vehicle,
an output during charging by the internal combustion engine,
an output supplied to the traction battery to charge said traction battery, and/or
the driving style or the portion of the recuperated or recuperable energy relative to the total drive energy.

The output during charging by the internal combustion engine may include the mechanical power taken up by the electric machine, the electric output given off by the electric machine operated as a generator, or the output delivered to the traction battery by the electric machine functioning as a generator.

The consumption parameters can be detected on the basis of a current measurement. This measurement can relate to instantaneous values, although the measurement may be acquired over a defined measurement period or as a moving average. In some embodiments, an upcoming route of a navigation device is used as the basis for the detection. In this case, a destination is detected via user input, or a destination is estimated on the basis of historical data. If the same destination was frequently driven to within the same time-of-day interval on a workday, for example, this destination will be assumed if the vehicle is started up at a point in time that falls within this time-of-day interval.

The navigation device determines the route on the basis of this destination in a known way. In some embodiments, instead of determining the route, the route that has been previously traveled within this time-of-day interval can be utilized on the basis of historical data. The navigation device delivers data on downhill and uphill grades, traffic and road conditions, and/or weather data (on the basis of a current traffic or weather service) for the route, and therefore these data can be utilized in the detection of the consumption parameters. Therefore, the consumption parameters for a future period of time can be estimated on the basis of the upcoming route that the navigation device of the hybrid vehicle delivers.

In particular, the consumption parameters can be estimated on the basis of traffic, road, or weather conditions of the upcoming route. The road conditions include, in this case, uphill grades and downhill grades, for example.

In the classification step, consumption parameter values that are relevant for each consumption parameter can be subdivided into at least two classes. The subdivision into classes may be implemented by means of class boundaries. The class boundaries define a hyperspace which separates differently classified consumption parameter values. The hyperspace can also be designed as a hyperplane. Furthermore, the values can be additionally (non-linearly) mapped to the class boundaries before the comparison, in order to strengthen the delimitation with respect to the class boundaries. Different states of charge can be assigned to different combinations of classes. This would correspond to a one-to-one mapping. This applies, in particular, only for one subgroup of all combinations or classes.

In addition, the driver-specific behavior is utilized (e.g., as a parameter that depicts the driving style or the level of an economical driving style) for determining the state of charge. This parameter expresses whether the driver (as compared to a driver having an average driving style) tends to require a great deal of traction output and less can be recuperated, because the output converted during the braking deceleration exceeds that of the electric machine. The state of charge is therefore substantially influenced. Furthermore, such a parameter can be depicted by a portion of the recuperated energy relative to the total drive energy (e.g., for one driving route).

In some embodiments, individual states of charge, which can be identical or which can differ from one another, are assigned to different combinations. Therefore, this can be generally referred to as a unique (not necessarily one-to-one) mapping of the combinations onto states of charge of classes, in particular since different combinations can result in the same states of charge (e.g., due to compensation effects). The mapping maps the detected consumption parameter values onto the associated state of charge in each case.

The determination of the state of charge and the training are carried out by means of a support vector machine (SVM). The consumption parameter is mapped by means of the SVM. The consumption parameter values relate to or form a vector of the support vector machine. The class boundaries are depicted by a hyperplane (generally by a hypersurface).

The training of the class boundaries is carried out by adapting the class boundaries to detected consumption parameters that correspond to the training vectors or training objects of the SVM. The training vectors or training objects are historical data of the vehicle itself or of other vehicles, in particular other vehicles having comparable properties or other vehicles that travel the same route.

The step of mapping and/or training is carried out in a calculation device within the hybrid vehicle. In some embodiments, however, the mapping step is carried out in a stationary calculation device. This calculation device can be a central or distributed calculation device. The consumption parameters detected (in the vehicle) are transmitted from the hybrid vehicle to the calculation device. The aforementioned estimates can also be carried out in the stationary calculation device. In this case, values measured in the vehicle (or other values on which the estimate is based, e.g., the route) are transmitted to the calculation device. The state of charge which has been determined (in the calculation device) is transmitted from the calculation device to the hybrid vehicle.

The transmission may be carried out via a radio link, e.g., via a radio link according to a (cell-based) mobile telecommunications protocol or a mobile data telecommunications protocol (GSM, GPRS, EDGE, UMTS, HSDPA, LTE or others) or according to a wireless transmission protocol (e.g., a radio-based protocol of the class IEEE 802, for example, 802.15 or 802.11).

The calculation device can therefore be one central server or a decentralized multitude of servers designed for transmitting and receiving data. The data may be transmitted in an encrypted manner and may not be personalized. Furthermore, the access to the calculation device and its programming may be protected. Data that relate to only one vehicle are transmitted only to this vehicle. Finally, data that relate to only one vehicle are transmitted only to the calculation device. There can be protected data links to other vehicles, however, e.g., via a car-to-car connection protocol, provided authorization has been provided by the driver therefor.

Advantages may result with respect to the robustness of the method when data from multiple vehicles are processed jointly. The mapping step may be carried out in the stationary calculation device, wherein the mapping step is carried out by means of a joint mapping for multiple vehicles. Due to the classification, which can also include the vehicle type or its performance features (electric driving power, drive train equipment, traction battery capacity), vehicle data that depict the same situation for different vehicles can be classified into the same class. As a result, the power of the data is that much higher, the greater the amount of vehicle data there is that can be mapped by means of the same mapping, and therefore the statistical investigation and, therefore, the mapping, becomes more robust.

The future state of charge determined in this way is taken into account in the operation of the vehicle, in particular during the adjustment of the operation of the vehicle, for example in the definition of the output, the duration, and the selection of a certain operating mode. The state of charge ascertained by means of the mapping is utilized, in particular, for defining or adjusting a (maximum) coasting duration, the (maximum) recuperation performance, the (maximum) recuperation duration, the charging rate (in particular during recuperation) of the traction battery, the maximum output (or the duration) of the electric support (in particular with respect to a temporary "boost mode"), in defining the load point of an internal combustion engine (in the case of a hybrid vehicle), or a (maximum) support output in a sailing mode. While the total driving power is zero in a coasting mode, the electric driving power is not zero in a sailing mode. In the sailing mode, a speed is held essentially constant (approximately with an acceleration rate of no more than 10 km/h relative to 10 sec) by means of the electric drive. In the sailing mode, in particular, no more than 20%, 10%, 5% or 2% of the nominal power of the electric drive is retrieved.

In some embodiments, at least one of the following parameters may be adjusted as the operating parameter:
  the activation state of an electric traction machine and an internal combustion engine of the vehicle;
  the charging rate of the traction battery;
  the output of the air conditioning system;
  the output of the windshield heating system;
  the output of the lighting system;
  the output of the catalytic converter heating system;

the maximum duration of a sailing or coasting phase; and recuperation performance.

Furthermore, a parameter can be used as an operating parameter that has influence on the driving style of the driver, e.g., a displacement-force line of a gas pedal having a controllable restoring force, a display that displays the level of an economical driving style, or the response characteristic of the gas pedal (or the implementation of the gas pedal actuation).

The parameter or parameters are adjusted in accordance with an optimization objective. The optimization objective may include a minimized total consumption or a maximum portion of the electric drive energy with respect to the total drive energy (e.g., until the objective has been reached or relative to a route). Furthermore, the optimization objective can be a maximum service life, a maximum range, or a maximum charging current of the traction battery. In some embodiments, not only is one of the optimization objectives pursued; a weighted combination of these optimization objectives can be provided as an overall optimization objective. For a combination of optimization objectives, it is possible to use a "best fit" method for the optimization, for example, which takes the weighting into account.

In this way, the state of charge can be held low in a targeted manner (e.g., less than 80% or 60%) on the basis of the (future) state of charge, for example, which relates, for example, to the state of charge that exists when the destination is reached, when an intermediate destination is reached, such as the beginning of a downhill portion of the route, or when driving is started again (at a predetermined or estimated time).

As a result, it is possible to go easy on the traction battery, e.g., if there will be a longer rest phase after the driving destination has been reached, or the charging rate (which decreases as the state of charge increases) can be increased in a targeted manner, in particular in order to take up recuperation energy. The state of charge can be held low in a targeted manner if a high charging rate is desired at the trip destination or at the beginning of a recuperation segment of the route (i.e., a downhill segment of the route), which is not possible at a higher state of charge (e.g., less than a safety margin of, e.g., 40%, 30% or 20% or 10%). The state of charge corresponds to the stored or retrievable energy relative to the current capacity or the nominal capacity. Such a conditioning of the traction battery based on a future state of charge, which was determined by a mapping having trainable class boundaries, makes it possible to easily and anticipatorily adjust or condition the drive train and, in particular, the traction battery, and further makes it possible to prepare components of the vehicle train for future situations (recuperation phases, phases of electric driving, e.g., with high output, etc.). These components are, in particular, the traction battery and its power electronics.

FIG. 1 is a flowchart illustrating an example method 100 for operating a hybrid or electric vehicle, incorporating teachings of the present disclosure. In some embodiments, method 100 may be initiated during operation of the vehicle.

At Step 110, method 100 may include detecting multiple consumption parameters of a hybrid vehicle.

At Step 120, method 100 may include determining a future state of charge of a traction battery of the vehicle by mapping the consumption parameters onto a state-of-charge value, wherein the mapping includes classifying the multiple consumption parameters according to trainable class boundaries, wherein the classification step includes subdividing consumption parameter values relevant for each consumption parameter into at least two classes based on the class boundaries, wherein the class boundaries define at least one hypersurface separating differently classified consumption parameter values.

At Step 130, method 100 may include training the class boundaries based at least in part on the detected consumption parameters and an associated measured state of charge.

At Step 140, method 100 may include adjusting an operating parameter of a traction power component of the hybrid vehicle according to the determined future state of charge.

Figure 2:
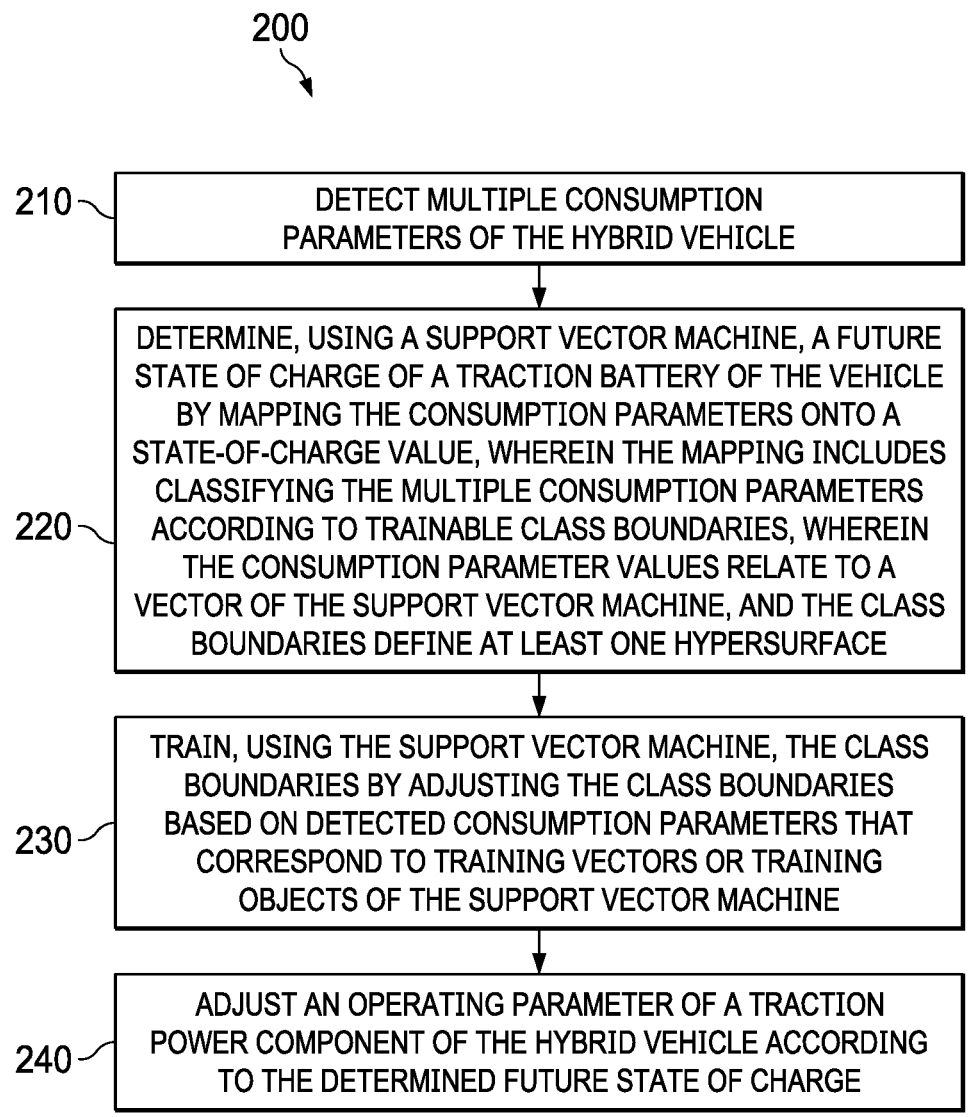
FIG. 2 is a flowchart illustrating a method incorporating teachings of the present disclosure.

FIG. 2 is a flowchart illustrating an example method 200 for operating a hybrid or electric vehicle, incorporating teachings of the present disclosure. In some embodiments, method 200 may be initiated during operation of the vehicle.

At Step 210, method 200 may include detecting multiple consumption parameters of the hybrid vehicle.

At Step 220, method 200 may include determining, using a support vector machine, a future state of charge of a traction battery of the vehicle by mapping the consumption parameters onto a state-of-charge value, wherein the mapping includes classifying the multiple consumption parameters according to trainable class boundaries, wherein the consumption parameter values relate to a vector of the support vector machine, and the class boundaries define at least one hypersurface.

At Step 230, method 200 may include training, using the support vector machine, the class boundaries by adjusting the class boundaries based on detected consumption parameters that correspond to training vectors or training objects of the support vector machine.

At Step 240, method 200 may include adjusting an operating parameter of a traction power component of the hybrid vehicle according to the determined future state of charge.

What is claimed is:

1. A method for operating a hybrid or electric vehicle, the method comprising:
   detecting multiple consumption parameters of the hybrid vehicle;
   determining a future state of charge of a traction battery of the vehicle by mapping the consumption parameters onto a state-of-charge value, wherein the mapping includes classifying the multiple consumption parameters according to trainable class boundaries;
   wherein the classification step includes subdividing consumption parameter values relevant for each consumption parameter into at least two classes based on the class boundaries,
   wherein the class boundaries define at least one hypersurface separating differently classified consumption parameter values,
   training the class boundaries based at least in part on the detected consumption parameters and an associated measured state of charge; and
   adjusting an operating parameter of a traction power component of the hybrid vehicle according to the determined future state of charge.

2. The method as claimed in claim 1, wherein the multiple consumption parameters include one or more of the following:
   vehicle speed of the vehicle;
   acceleration of the vehicle;
   an engaged gear of a traction transmission;
   a battery terminal voltage of the traction battery or its rate of change;
   an output of an electric traction machine;
   an output of an air conditioning system;

an output of a windshield heating system;
an output of a lighting system;
an output of a catalytic converter heating system;
an output for traveling on an uphill grade;
an output of an engageable electric all-wheel auxiliary drive;
recuperation performance;
a charging rate during charging by the internal combustion engine; and
an identified driving style.

3. The method as claimed in claim 2, wherein detecting the consumption parameters includes a current measurement.

4. The method as claimed in claim 3, wherein the consumption parameters are estimated on the basis of traffic, road, or weather conditions of the upcoming route.

5. The method as claimed in claim 1, wherein a support vector machine performs the determination of the state of charge and the training, including mapping the consumption parameter,
wherein the consumption parameter values relate to a vector of the support vector machine, the class boundaries are depicted by a hyperplane, and
wherein training of the class boundaries includes adapting the class boundaries to detected consumption parameters that correspond to the training vectors or training objects of the support vector machine.

6. The method as claimed claim 1, wherein a calculation device of the hybrid vehicle performs the mapping step.

7. The method as claimed in claim 1, wherein in the calculation device, the mapping step includes a joint mapping for multiple vehicles.

8. The method as claimed in claim 1, wherein at least one of the following parameters is adjusted as the operating parameter in accordance with an optimization objective:
an activation state of an electric traction machine and an internal combustion engine of the vehicle;
a charging rate of the traction battery;
an output of the air conditioning system;
an output of the windshield heating system;
an output of the lighting system;
an output of the catalytic converter heating system; and
a maximum duration of a sailing or coasting phase.

9. The method as claimed in claim 8, wherein the optimization objective is a minimized total consumption, a maximum service life, a maximum range, or a maximum charging current of the traction battery, or a weighted combination of these optimization objectives.

10. The method as claimed in claim 2, wherein the consumption parameters are estimated for a future period of time on the basis of an upcoming route of a navigation device of the vehicle.

11. The method as claimed claim 1, wherein a stationary calculation device outside the hybrid vehicle performs the mapping step,
the detected consumption parameters are transmitted from the hybrid vehicle to the calculation device, and
the determined state of charge is transmitted from the calculation device to the hybrid vehicle.

12. The method as claimed in claim 1, wherein, in the classification step, different states of charge are assigned to different combinations of classes, and
wherein detecting the consumption parameter values includes mapping the associated state of charge.

13. A method for operating a hybrid or electric vehicle, the method comprising:

detecting multiple consumption parameters of the hybrid vehicle;
determining, using a support vector machine, a future state of charge of a traction battery of the vehicle by mapping the consumption parameters onto a state-of-charge value, wherein the mapping includes classifying the multiple consumption parameters according to trainable class boundaries;
wherein the consumption parameter values relate to a vector of the support vector machine, and the class boundaries define at least one hypersurface, and
training, using the support vector machine, the class boundaries by adjusting the class boundaries based on detected consumption parameters that correspond to training vectors or training objects of the support vector machine; and
adjusting an operating parameter of a traction power component of the hybrid vehicle according to the determined future state of charge.

14. The method as claimed in claim 13, wherein the multiple consumption parameters include one or more of the following:
vehicle speed of the vehicle;
acceleration of the vehicle;
an engaged gear of a traction transmission;
a battery terminal voltage of the traction battery or its rate of change;
an output of an electric traction machine;
an output of an air conditioning system;
an output of a windshield heating system;
an output of a lighting system;
an output of a catalytic converter heating system;
an output for traveling on an uphill grade;
an output of an engageable electric all-wheel auxiliary drive;
recuperation performance;
a charging rate during charging by the internal combustion engine; and
an identified driving style.

15. The method as claimed in claim 14, wherein detecting the consumption parameters includes a current measurement.

16. The method as claimed in claim 13, further comprising, in the classification step, subdividing consumption parameter values relevant for each consumption parameter into at least two classes by means of the class boundaries, wherein the class boundaries define a hypersurface separating differently classified consumption parameter values, wherein different states of charge are assigned to different combinations of classes, and
detecting the consumption parameter values includes mapping the associated state of charge.

17. The method as claimed in claim 13, wherein at least one of the following parameters is adjusted as the operating parameter in accordance with an optimization objective:
an activation state of an electric traction machine and an internal combustion engine of the vehicle;
a charging rate of the traction battery;
an output of the air conditioning system;
an output of the windshield heating system;
an output of the lighting system;
an output of the catalytic converter heating system; and
a maximum duration of a sailing or coasting phase.

18. The method as claimed in claim 17, wherein the optimization objective is a minimized total consumption, a maximum service life, a maximum range, or a maximum charging current of the traction battery, or a weighted combination of these optimization objectives.

19. The method as claimed in claim 14, wherein the consumption parameters are estimated for a future period of time on the basis of an upcoming route of a navigation device of the vehicle.

20. The method as claimed in claim 13, wherein a stationary calculation device outside the hybrid vehicle performs the mapping step,
   the detected consumption parameters are transmitted from the hybrid vehicle to the calculation device, and
   the determined state of charge is transmitted from the calculation device to the hybrid vehicle.

\* \* \* \* \*